Patented May 8, 1934

1,957,744

UNITED STATES PATENT OFFICE 1,957,744

PRODUCTION OF GASEOUS MIXTURES CONTAINING HYDROGEN AND NITROGEN FROM METHANE

Gustav Wietzel and Georg Schiller, Mannheim, Germany, assignors to I. G. Farbenindustrie Aktiengesellschaft, Frankfort - on - the - Main, Germany No Drawing. Application July 18, 1932, Serial No. 623,288. In Germany April 21, 1928

3 Claims. (Cl. 23—7)

This application is a continuation-in-part of our application Ser. No. 340,016 filed 14th February, 1929, now Patent No. 1,921,856, which relates to improvements in the manufacture and production of gaseous mixtures containing hydrogen and nitrogen from methane, and in particular of such gaseous mixtures suitable for the synthesis of ammonia.

It is known that mixtures of hydrogen and carbon monoxide, which contain less than 1 per cent of methane can be obtained from methane or gases containing methane, such as natural gas, coke furnace gas and the like, all of the said gases being hereinafter referred to as "gases comprising methane", by treating the same with steam at elevated temperatures. Catalysts may also be employed in the said process, such as those comprising nickel, iron or cobalt, which metals are hereinafter referred to as "metals of the iron group", activated, for example, by additions of difficultly reducible metal oxides, such as alumina. When catalysts are employed, lower temperatures can be employed than without the employment of catalysts. Thus with the employment of catalysts the temperatures usually range between about 650° and 1000° C., whereas without catalysts temperatures above this range must be employed, for example of between about 1000° and 1300° C. and preferably of about 1200° C.

In order to produce the heat necessary for this conversion it has been suggested to burn a portion of the methane with oxygen or air, by adding to the mixture of methane and steam a quantity of oxygen or air which is insufficient to cause complete combustion to carbon dioxide and water, but which is usually equal to or less than that required according to the equation $$2CH_4 + O_2 = 2CO + 4H_2$$

with the said portion of methane.

The temperature required can also be produced by exterior heating, for example, by passing the methane and steam through tubes or other suitably shaped chambers filled with very active catalysts, such as the activated catalysts mentioned above, in which chambers the gases are heated to the requisite temperature, for example of between about 650° and 750° C. from the exterior.

We have now found that it is frequently preferable in the production of hydrogen or gases containing it from methane or gases containing methane by means of steam to regulate the working conditions in this process, namely the temperature, the amount of steam and the rate of flow of the gases, in such a manner that there is still an appreciable quantity of methane, for example 2 to 15 per cent and usually about 4 to 5 per cent remaining in the gas obtained and subsequently removing the residual methane by washing the compressed gas, preferably previously freed from carbon dioxide, at low temperatures with liquid nitrogen. The said incomplete decomposition with steam is attained, in particular by operating at a temperature lower than that at which the aforesaid process is carried out, such reduction of the temperature usually being by about 100° C. and, if desired, also reducing the amount of steam introduced or increasing the rate of flow of the gases or any of the steps combined. The most suitable conditions may be ascertained in each case by a simple test. The said treatment with steam may also be carried out under pressure, or, if desired, under reduced pressure.

We have found that the said method of working is particularly well adapted for the production of mixtures of hydrogen and nitrogen, and in particular of such gaseous mixtures suitable for employment as initial materials in the synthesis of ammonia, if the requisite amount of nitrogen is introduced into the gas mixture by washing out with liquid nitrogen.

By the washing with liquid nitrogen also the carbon monoxide is removed from the gas. It may, however, also be of advantage to convert the greater part of the carbon monoxide present into carbon dioxide and hydrogen by means of steam, and after removal of the carbon dioxide formed and subsequent cooling of the remaining gas to a low temperature, to treat the gaseous mixture so obtained with liquid nitrogen.

The process according to the present invention has the great advantage that, since lower temperatures can be employed than when a gas is to be produced directly containing only little methane, the material of the apparatus which particularly in the first stage of the process may be constructed of alloy steels, such as those marketed by the firm of Krupp under the trademarks Nicrotherm, WT2 or V2A, does not suffer so much wear owing to the heat treatment as in the processes hitherto employed in which gases containing less than 1 per cent of methane are obtained directly. The said process has the further advantage that thicker layers of catalysts and a greater velocity of flow can be employed, than when the operation is carried out under such conditions that gaseous mixtures containing less than 1 per cent of methane are obtained directly.

The following example will further illustrate the nature of the said invention, but the invention is not restricted to this example.

Example 10 cubic meters of methane and 20 kilograms of steam are passed per hour through a pipe, constructed of the alloy "Nicrotherm 3" prepared by the steel manufactories Krupp, and having a diameter of about 10 centimeters and a length of 2 meters, said pipe being filled with a catalyst prepared from aluminum hydroxide and nickel oxide and heated from outside to a temperature from 800° to 900° C. In this manner 35 cubic meters of gas are obtained having the following composition:

12 per cent of carbon dioxide, 68 per cent of hydrogen, 7 per cent of carbon monoxide, 10 per cent of methane and 3 per cent of nitrogen.

The gas thus obtained is compressed to 10 atmospheres, and after being washed with water and subsequently with a caustic soda solution, in order to free it entirely from carbon dioxide, it is cooled to a low temperature and washed with liquid nitrogen.

It may be preferable first to cool the compressed gas to a low temperature, for example 180° below zero C. whereby the main part of methane (up to about 2 per cent) is condensed and then to wash the residual gas with liquid nitrogen. If nitrogen is not taken up in the gas in amounts sufficient for rendering the gas suitable for directly being employed for the synthesis of ammonia additional gaseous nitrogen may be supplied to the gas in an amount establishing the desired ratio.

29 cubic meters of a mixture consisting of 75 per cent of hydrogen and 25 per cent of nitrogen are thus obtained, which after being compressed to still higher pressures may be directly employed for the preparation of ammonia; in addition thereto 9.6 cubic meters of waste gas are obtained having a calorific power of 4380 kilogram calories per cubic meter.

What we claim is:

1. A process for the production of a mixture of hydrogen and nitrogen and in particular of a gaseous mixture suitable for the synthesis of ammonia which comprises subjecting methane to incomplete catalytic conversion with steam so that from 2 to 15 per cent of methane remain in the gas obtained and then removing the methane from the gaseous mixture thus obtained by washing with liquid nitrogen by which procedure nitrogen is introduced to the gas.

2. A process for the production of a mixture of hydrogen and nitrogen and in particular of a gaseous mixture suitable for the synthesis of ammonia which comprises subjecting methane to incomplete catalytic conversion with steam so that from 2 to 15 per cent of methane remain in the gas obtained and then removing the methane from the gaseous mixture thus obtained by washing with liquid nitrogen, thus producing a gaseous mixture containing about 3 volumes of hydrogen to each volume of nitrogen.

3. A process for the production of a mixture of hydrogen and nitrogen and in particular of a gaseous mixture suitable for the synthesis of ammonia which comprises passing a gas containing methane in admixture with steam at a temperature of about 500° to 600° C. over a catalyst prepared from nickel oxide and aluminium hydroxide, then passing the gas thus obtained in admixture with steam over a catalyst comprising iron oxide to convert the carbon monoxide into carbon dioxide, freeing the gas from carbon dioxide and then washing out the methane from the gas mixture by means of liquid nitrogen thus introducing so much nitrogen as to produce a gas mixture consisting of about 3 volumes of hydrogen for each volume of nitrogen.

GUSTAV WIETZEL.
GEORG SCHILLER.